No. 869,263. PATENTED OCT. 29, 1907.
H. P. RANKIN.
TRAP NEST.
APPLICATION FILED DEC. 26, 1906.
2 SHEETS—SHEET 1.
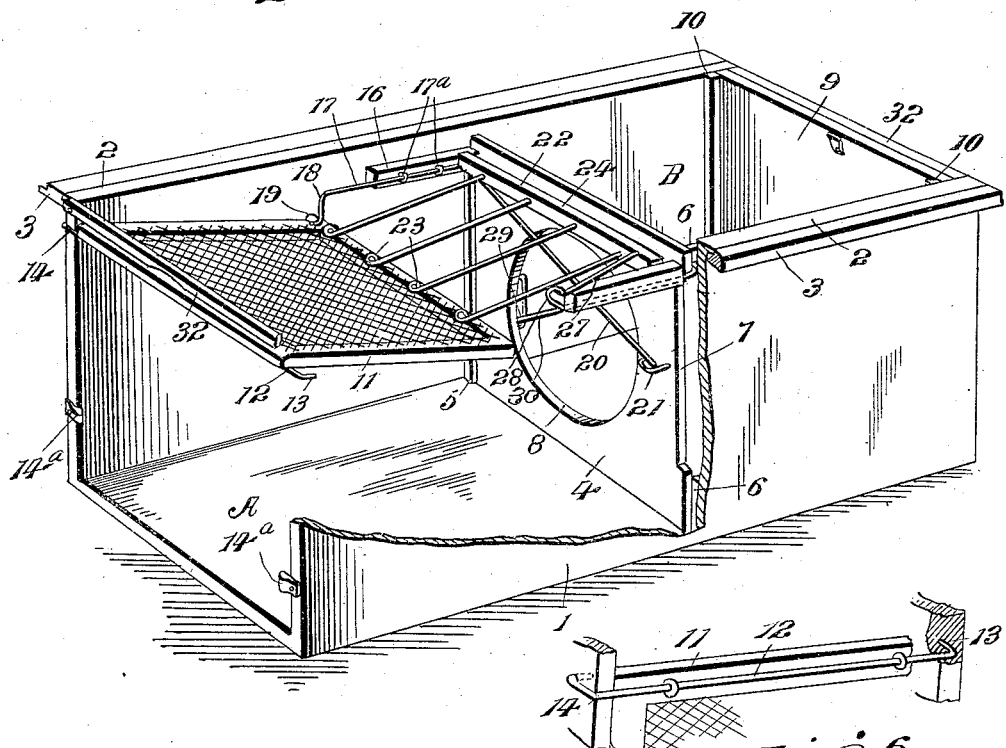
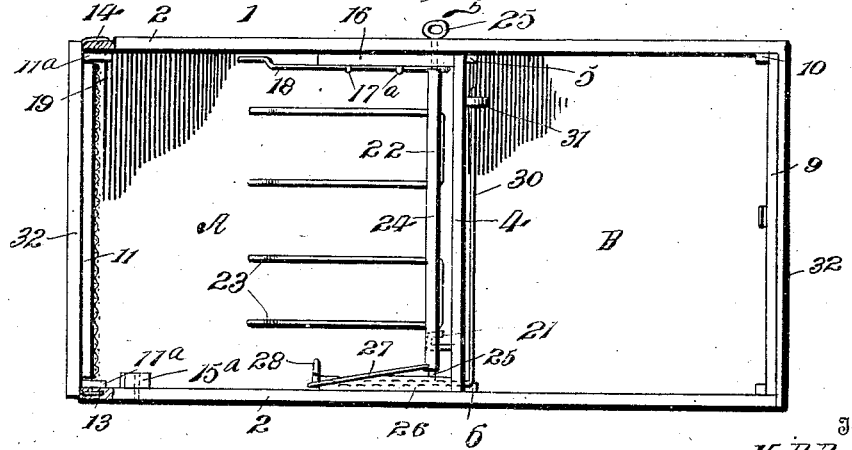
Witnesses Inventor
 H. P. Rankin.
 By
 Attorneys No. 869,263. PATENTED OCT. 29, 1907.
H. P. RANKIN.
TRAP NEST.
APPLICATION FILED DEC. 26, 1906.
2 SHEETS—SHEET 2.
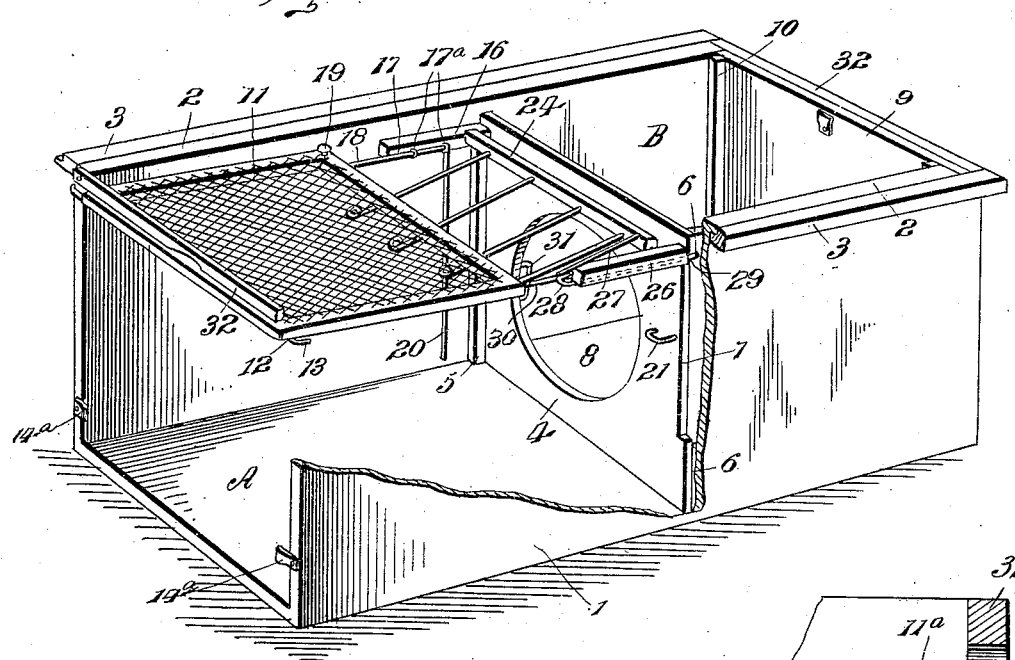
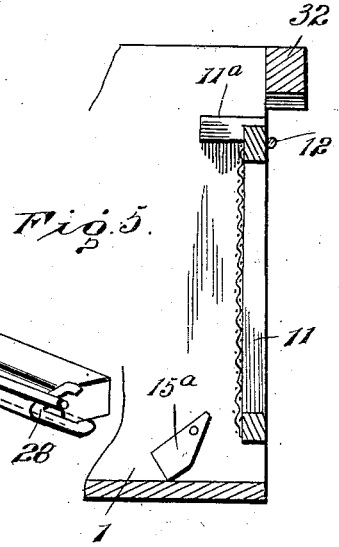

UNITED STATES PATENT OFFICE.

HERMAN P. RANKIN, OF HARTINGTON, NEBRASKA.

TRAP-NEST.

No. 869,263.   Specification of Letters Patent.   Patented Oct. 29, 1907.

Application filed December 26, 1906. Serial No. 349,437.

*To all whom it may concern:*

Be it known that I, HERMAN P. RANKIN, a citizen of the United States, residing at Hartington, in the county of Cedar and State of Nebraska, have invented certain new and useful Improvements in Trap-Nests, of which the following is a specification.

This invention contemplates certain new and useful improvements in trap nests, and the object of my invention is to provide a simple and cheap construction of nest of this character which will combine all of the necessary features or elements that go to make up an efficient and successful device of this character, the invention consisting in certain constructions, arrangements and combinations of the parts hereinafter described and claimed.

For a full description of the invention and the merits thereof and also to acquire a knowledge of the details of construction of the means for effecting the result, reference is to be had to the following description and accompanying drawings, in which:

Figure 1 is a perspective view of my improved nest, illustrating it as arranged for trapping; Fig. 2 is a top plan view thereof; Fig. 3 is a perspective view of the nest arranged as a setting nest; Fig. 4 is a detail perspective view of one of the trip mechanisms; Fig. 5 is a detail sectional view illustrating the gravity latch herein described. Fig. 6 is a detail perspective view of a portion of the front door illustrating particularly the means for pivotally mounting the said door.
Corresponding and like parts are referred to in the following description and indicated in all the views of the drawings by the same reference characters.

Referring to the drawings, the numeral 1 designates the box which comprises the nest proper and which may be provided along its upper side edges with outstanding flanges 2 designed to be received upon supporting guides 3, so that the box may be drawn out from the supports or slide backwardly again in the nature of a drawer. These supporting guides or strips 3 may be provided with flanges that are complemental to the flanges 2 and which may extend along either one or both sides of the said guide strips according to whether a single nest is used or a series arranged side by side where the one guide may serve as a support for two adjacent nests. The said guides 3 may be attached to the under side of the roost platform or dropping boards, as is manifest to those familiar with poultry raising.

The box 1 is provided with a transverse partition 4 which is slidable vertically between vertical guides 5 at one edge and between two pairs of spaced guides 6 (upper and lower) at its other end, and the said partition may be removed whenever desired by withdrawing it vertically. The partition 4 is provided at one side edge with a recess 7, for a purpose hereinafter described. The partition 4 divides the box 1 into a front compartment A and a rear compartment B and communication is established between these two compartments by means of an opening 8 in the said partition.
The rear end of the box may be opened or closed by a vertically removable door 9 that slides between vertical guides 10, on one face and the cross bars of the adjacent end of the box on the opposite face.

The outer or front end of the box 1 is provided with a swinging outer trap door 11 that is swung from a transversely extending rod-like pintle 12 to which it may be pivotally secured by means of staples as shown in Fig. 6, and this rod-like pintle 12 is provided with a hooked end 13 which extends laterally therefrom and is adapted to enter an opening formed to receive it in the front ege of one side of the box, while the opposite end 14 of the said pintle is bent laterally and thence returned upon itself as shown, so as to extend around the opposite corner of the box with its extremity extending into an opening formed to receive it in the outer wall of the opposite side of the box. Preferably the front end of the box is provided with strips 14$^a$ of heavy fabric which constitute stops to limit the outward swinging movement of the lower free edge of the door, said stops being of such character that the attendant may force them back and swing the door outwardly, but at the same time the strips being of such strength that a hen may not be able to move the door in this direction. In connection with these stops a gravity latch 15$^a$ is pivotally mounted on the inner wall of the opposite side of the box contiguous to the lower edge of the outer trap door 11, this latch being positive in action and adapted to secure the hen in the trap until the attendant comes to release her.

In order to hold the trap door 11 in an elevated position until tripped by the hen, as she enters the nest, I provide a bearing strip or block 16 which is secured to the inner wall of one side of the box as shown and to which a longitudinally extending crank rod 17 is journaled, preferably by staples 17$^a$, the said crank rod being arranged to turn about its longitudinal axis and also having a sliding longitudinal movement through the said staples. At one end this rod is provided with a crank 18 having an outwardly projecting extremity as shown, and this extremity of the crank is adapted to coact with a keeper 19 projecting from one side of the free edge of the door, as clearly illustrated in the drawings. This keeper may be a headed stud, so that when the rod is turned to bring the outwardly projecting extremity of the crank 18 underneath the head of the stud, the said trap door will be held elevated and maintain the opening into the nest unobstructed until the hen enters and trips the rod so as to release the door and permit it to drop down and be caught by its gravity catch. For the purpose of tripping the rod 17, the said rod is preferably formed of stout wire and is provided at the end opposite the crank 18 with an offset or angularly disposed tripping arm 20 which is adapted to project across the opening 8 of the partition 4 and to rest with its end upon the hooked rest 21 which is secured to said partition. The free end of this hook rest is spaced somewhat from the face of the partition, so that the end of the tripping arm 20 may be disengaged from the rest and thus permitted to drop, when it is moved either from the partition or towards the same. It is manifest that when the outer trap door is held elevated as above described, with the tripping arm extending across the opening 8 and having its end supported on the rest 21, that any attempt by the hen to pass through the opening 8 to the nest must be accompanied by the disengagement of the arm 20 from its rest, whether the hen attempts to go over the arm or underneath the same, or whether she attempts to pull the arm to one side by her beak. As soon as the arm shall have been moved out of engagement with the rest 21, the weight of the trap door 11 as well as the weight of the tripping arm 20 will cause the rod 17 to turn about its longitudinal axis and thereupon release the door and permit the same to drop across the front opening leading into the box. The hen will manifestly then be trapped and can only be released by an attendant. The outer trap door 11 is mainly intended for use in trapping hens, so as to keep a record of the eggs laid, and thereby keep tab on the hens so that the drones may be at once segregated or distinguished from the laying hens. My improved nest, however, is further intended to be used for setting hens, in which event it is a desideratum that the nest be provided with means for permitting the setting hen to leave her nest for water or food and return again to the nest, and for this purpose some means must be provided for closing the nest to the exclusion of all other hens when the setting hen returns, thereby insuring that the particular hen and one hen only shall occupy each nest and avoiding chilled and broken eggs which result from two or three hens getting on the same nest. To carry out this feature of the invention, I provide the nest with an inner trap door 22 which is adapted to close the opening 8 leading into the compartment B and which is so arranged that the hen may raise or open the said inner trap door whenever desired, the door being automatically held open so long as the hen is absent, but at once automatically closing again when she returns to the nest. The door 22 in the present instance consists of a series of wire arms that are curled at their outer ends as indicated at 23 so as to preclude the possibility of injury to the hen as she scrapes past them and which are secured at their opposite ends to a cross bar 24 which is journaled upon a rod 25 extending across the box and through the block 16 to another block 26 on the opposite side of the box. This journal rod 25 projects out from one side of the box and may be withdrawn whenever desired so as to remove the inner trap door 22. To complete the removal of all the mechanism pertaining to this inner trap door, the block 26 is screwed in place, and can be readily removed by merely taking out its attaching screws.

The trap door 22 is adapted to swing downwardly by gravity and it is provided with a finger 27 which projects out from one end of the cross bar 24 and which is preferably of stout wire that may be bent whenever desired to different positions. This finger 27 is adapted to coact with the beveled catch 28 which is, in the present instance, formed by bending laterally and returning upon itself one end of a releasing rod 29. This rod is journaled to turn about its longitudinal axis in staples on the under side of the block 26 and is disposed longitudinally of the box with its beveled latch 28 foremost. Its opposite end is bent laterally to provide a tripping arm 30 which is adapted to extend across the opening 8 at the rear side of the partition 4 and which is mounted at its extremity within a vertically disposed guide loop 31 secured to the far side of said partition. 32 designates transverse cleats which are secured to the ends of the box 1 and which not only strengthen the box and prevent the nest from spreading, but which may be used as hand holds for carrying the box from place to place or for sliding it in and out if the box be in the nature of a drawer. It is obvious that any form of lid may be used for the box.

The practical operation of the nest as a trap nest solely, has been above described, with the exception that when the box, as I propose to have it arranged is also provided with an inner trap door, it is desirable that the said inner trap door be held in a raised inoperative position, and that the opening through the partition 4 be unobstructed. For this purpose, the finger 27 is formed of wire as above stated, or some similar material that may be bent to different positions. Thus, to hold the inner trap door elevated and in an inoperative position, the trap door 22 is raised to a substantially horizontal position, and said finger 27 is then bent downwardly in alinement with the wires which constitute the said door and is then bent laterally so as to rest upon the upper surface of the supporting block 26. Now, it is obvious that the hen may enter the nest and pass freely through the opening 8 in the partition 4, because the consequent movement of the tripping arm 30 will have no effect upon the inner trap door, the same being held in an upward position, and being incapable of being tripped. Or, if desired, the partition 4 can be raised high enough to entirely remove the tripping arm 30 from within the guide loop 31, and then by again lowering the partition 4 to its normal position and dropping the tripping arm 30 down into a vertical position, the said tripping arm is completely removed out of the way, where it may remain until its further use is desired. When, on the other hand, it is desired to use the nest for setting, the outer trap door is raised to substantially horizontal position, and the rod 17 is slid forwardly in its bearings until the main portion of said rod extends underneath the free edge of the door 11, the said rod being at the same time turned around until its trip arm 20 hangs freely down. It will then be seen that the outer trap door will be held elevated and not be capable of being tripped. Then the finger 27 of the inner trap door is bent back to assume its normal position, and is engaged with the beveled latch 28 of the releasing rod 29. After this adjustment has been made, it is obvious that when the hen enters through the opening 8 of the partition 4, she will so move the tripping arm 30 as to carry the latch 28 out of engagement with the finger 27 and permit the inner trap door to drop and close the opening 8 as against any further ingress from the outside of the nest. At the same time, as above stated, whenever the hen desires to leave the nest, it is obvious that she will be permitted to do so by simply passing outwardly underneath the wire arms which constitute the inner trap door, and when so doing she will raise the door far enough to automatically set it in a raised position and permit her return, the door being held raised by the engagement of the finger 27 and beveled latch 28. As the finger 27 is pliable, as above mentioned, it is manifest that it may be bent upwardly or downwardly according as it is desired to trip or swing the door open to a greater or less degree, according to the size of the hen.

If it is desired that the nest be used as a common nest, without the trap features, this may be accomplished by merely removing the partition 4 and substituting for it the rear door 9, and reversing the box end for end.

In order to insure that the front trap door 11 shall swing perfectly free and not bind, I provide guide blocks 11ª which are attached to the inner sides of the box on each side of the outer trap door 11 at its outer hinged end, and act as guides to keep the sides of the door from coming into contact with either side of the box. This will insure prompt, quick and full action of the door when tripped.

From the foregoing description in connection with the accompanying drawings, it will be seen that I have provided a very simple and yet complete construction of trap nest which will be sure in operation and which may be cheaply constructed and not liable to get out of order.

Having thus described the invention, what I claim as new is:

1. In a trap nest of the character described, the combination of a box, inner and outer trap doors connected to said box, means for holding either of said doors in an open position while the other is operating, means for tripping the inner door, and means for tripping the outer door.

2. In a trap nest of the character described, the combination of a box provided with a front trap door and a partition dividing the box into front and rear compartments, the said trap door being adapted to swing about a horizontal axis and suspended from its upper edge and provided at its free edge with a keeper, a rod extending longitudinally of one side of the box and journaled to rotate about its longitudinal axis, one end of said rod being adapted to engage said keeper, whereby to hold the door raised, there being provided an opening establishing communication between the two compartments of the box, a tripping arm extending from the other end of the said rod and adapted to extend across the said opening, and a rest for the free end of said trip arm.

3. In a trap nest of the character described, the combination of a box embodying front and rear compartments and provided with an opening establishing communication between said compartments, a trap door hinged at its upper edge to swing about a horizontal axis at the front of the box and provided at its lower free end with a keeper, a crank rod extending longitudinally of the box and journaled to rotate about its longitudinal axis, one end of said rod being provided with a crank arranged for engagement with said keeper whereby to hold the door raised, the other end of said rod being provided with a laterally extending trip arm adapted to extend across the opening between the compartments, and a rest for the free end of said arm, as and for the purpose set forth.

4. A trap nest of the character described, comprising a box embodying front and rear compartments, and provided with an opening establishing communication between said compartments, a front door hinged at its upper edge to the front of the box and provided at its free end with a keeper, a rod extending longitudinally of the box along one side thereof, a support upon which said rod is mounted to turn about its longitudinal axis and upon which it is slidable longitudinally, said rod being arranged for engagement with the said keeper whereby to hold the door raised, but capable of being tripped, and the said rod being arranged to slide longitudinal so as to carry its main portion underneath the free end of the door to hold said door raised as against the tripping action, and a tripping arm projecting laterally from the rod and adapted to extend across the said opening between the compartments, and a rest for the free end of said arm.

5. A trap nest of the character described, comprising a box embodying front and rear compartments, and a partition separating the same, said partition being formed with an opening establishing communication between the said compartments, a front trap door hinged at its upper edge across the front of the box, and means for supporting the free end of the door in an elevated position, a tripping arm connected to said supporting means and adapted to release the same from the door, said tripping arm being adapted to extend across the opening in the partition, and a hook rest secured to the partition and provided with a bent extremity which is spaced from the face of the partition, the said extremity being adapted to support the end of the tripping arm.

6. A trap nest of the character described, comprising a box, a partition dividing the box into front and rear compartments, said partition being provided with an opening establishing communication between the said two compartments, an inner trap door hinged at its upper edge to swing about a horizontal axis across the opening through the partition, a finger carried by said trap door, a rod extending longitudinally of the box and journaled to turn about its longitudinal axis and provided at one end with a beveled latch arranged for engagement by said finger whereby to hold the trap door elevated, and a tripping arm projecting from said rod and adapted to extend across said opening in the partition and arranged to rock the said latch out of engagement whereby to permit the door to close.

7. A trap nest, consisting of a box provided with an opening, and a trap door adapted to control said opening and close against the same, said trap door being provided with a pliable finger and mounted to swing about a horizontal axis, a latch arranged to support said finger whereby to hold the door raised, the pliability of the finger permitting the angle of the same with respect to the main part of the door to be changed, for the purpose specified, and a tripping arm operatively connected to said latch.

8. A trap nest of the character described, comprising a box formed with an opening and a trap door controlling the said opening and adapted to close against the same, said trap door being mounted to swing about a horizontal axis within the box and provided with a pliable supporting finger, a block secured within the box in proximity to said door and in a plane substantially level with the pivot point of the door, and a pliable finger secured to and projecting from the door and adapted to be bent over upon the said block, as and for the purpose specified.

9. A trap nest of the character described, comprising a box embodying front and rear compartments, a partition being provided to produce the said two compartments, said partition provided with an opening establishing communication between said compartments, a trap door mounted to swing about a horizontal axis at the said opening, a rod journaled within the box and provided at one end with a latch, the door being provided with a finger adapted to rest upon said latch, the other end of said rod being provided with a laterally extending tripping arm, and a guide loop within which the end of said tripping arm moves.

10. A trap nest provided with a transverse partition formed with an opening extending therethrough, said partition being removable, and a door at the rear end of the box, said door being also removable and interchangeable with the said partition, as and for the purpose set forth.

In testimony whereof I affix my signature in presence of two witnesses.

HERMAN P. RANKIN.

Witnesses:
H. J. OSWALD,
GEORGE NELSON.